US008772402B2

(12) United States Patent
Luo

(10) Patent No.: US 8,772,402 B2
(45) Date of Patent: Jul. 8, 2014

(54) PAINT TO BE SPRAYED ON THE SURFACE OF A SLIM TUBE-SHAPED BAMBOO PRODUCT AND A SPRAYING METHOD THEREOF

(75) Inventor: Ronghua Luo, Ningbo (CN)

(73) Assignee: Beifa Group Co., Ltd., Ningbo (CN)

( * ) Notice: Subject to any disclaimer, the term of this patent is extended or adjusted under 35 U.S.C. 154(b) by 685 days.

(21) Appl. No.: 12/582,592

(22) Filed: Oct. 20, 2009

(65) Prior Publication Data

US 2010/0104784 A1 Apr. 29, 2010

(30) Foreign Application Priority Data

Oct. 23, 2008 (CN) .......................... 2008 1 0121923

(51) Int. Cl.

*C09D 133/08* (2006.01)
*C09D 11/10* (2014.01)
*C09D 5/34* (2006.01)
*C09D 15/00* (2006.01)
*C08K 5/05* (2006.01)
*C08K 5/06* (2006.01)
*C08K 5/101* (2006.01)
*B32B 1/08* (2006.01)

(52) U.S. Cl.

USPC ........... 524/556; 524/560; 524/315; 524/366; 524/379

(58) Field of Classification Search

USPC .......................... 524/556, 560, 315, 366, 379
See application file for complete search history.

(56) References Cited

U.S. PATENT DOCUMENTS

| | | | | |
|---|---|---|---|---|
| 4,263,051 | A | 4/1981 | Crawford | |
| 4,304,711 | A | 12/1981 | Smith | |
| 5,458,920 | A | 10/1995 | Yezrielev | |
| 5,919,851 | A * | 7/1999 | Yamaguchi et al. | 524/268 |
| 6,331,582 | B1 * | 12/2001 | Chen et al. | 523/400 |
| 7,041,727 | B2 | 5/2006 | Kubicek | |
| 7,408,000 | B2 | 8/2008 | Nakayama | |
| 7,572,848 | B2 | 8/2009 | Savu | |
| 7,582,157 | B2 | 9/2009 | Remortel | |
| 2006/0089452 | A1 * | 4/2006 | Schneider et al. | 524/589 |

OTHER PUBLICATIONS http://www.pqcorp.com/pc/EMEA/Markets/SurfaceCoatings/SilicasMattingAgentsandFlattingAgents.aspx, 2011.*

* cited by examiner

*Primary Examiner* — Satya Sastri

(74) *Attorney, Agent, or Firm* — Christensen O'Connor Johnson Kindness PLLC

(57) ABSTRACT

A paint for spraying on bamboo products, such as on the exterior surface of a slim tube-shaped bamboo product, is a nonaqueous acrylic-based paint including 10 to 15 percent by weight of one or more flatting powders, 50 to 55 percent by weight of one or more acrylic resins, 1 to 5 percent by weight of one or more leveling agents, 13 to 16 percent by weight of one or more ester solvents, 10 to 15 percent by weight of one or more alcohol solvents, and 8 to 10 percent by weight of one or more ether solvents. After application of the wet paint composition, the solvents evaporate leaving a film of the acrylic resins, flatting powders, and leveling agents.

19 Claims, 1 Drawing Sheet

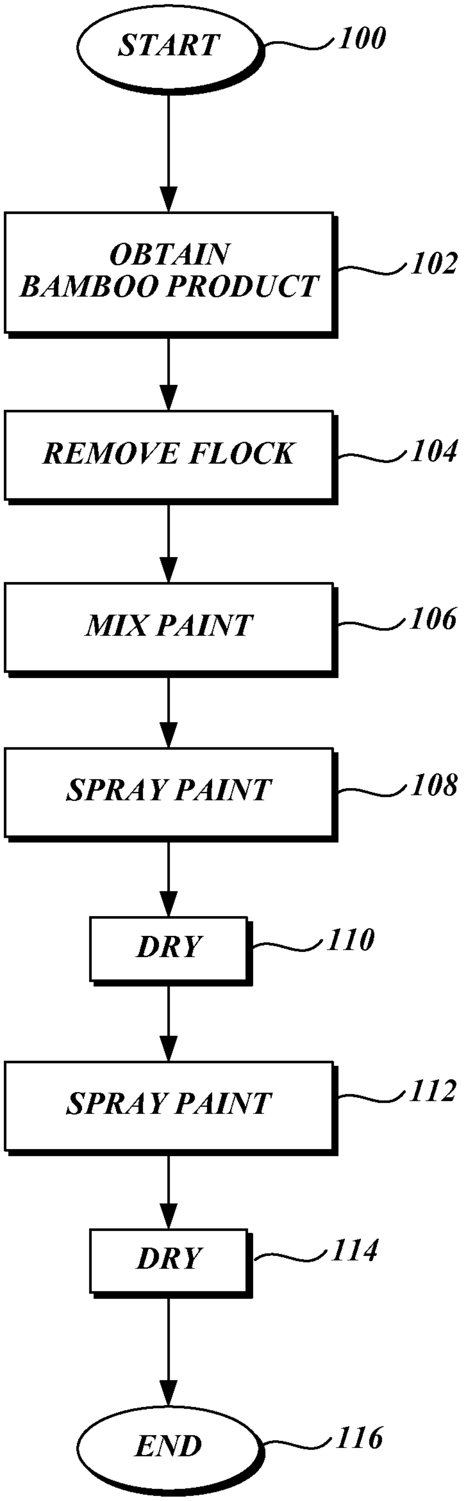
START
100
OBTAIN BAMBOO PRODUCT
102
REMOVE FLOCK
104
MIX PAINT
106
SPRAY PAINT
108
DRY
110
SPRAY PAINT
112
DRY
114
END
116

PAINT TO BE SPRAYED ON THE SURFACE OF A SLIM TUBE-SHAPED BAMBOO PRODUCT AND A SPRAYING METHOD THEREOF

BACKGROUND

With the growing environmental awareness of people, more and more bamboo products are being used because of bamboo's status as a renewable resource. However, bamboo products are not easily processed, in particular, slim tube-shaped bamboo products. Bamboo has large and uneven pores between the fibers that makes bamboo products difficult to paint. In the conventional painting process, a primer is first applied on the bamboo product and is then allowed to dry. Next, a putty is applied to fill in the pores of the primed bamboo product. After the putty hardens, the bamboo product is polished with emery paper. Subsequently, conventional paint is sprayed on the polished bamboo product and allowed to dry. Lastly, the painted bamboo product is varnished and allowed to dry. The conventional process is complicated and the production period is long; therefore, the painting costs are high. Furthermore, applying putty uniformly on the bamboo product is difficult.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure is related to a paint to be sprayed on the surface of bamboo products and is particularly suited for painting a slim tube-shaped bamboo product. The disclosed paint reduces the difficulties encountered with the prior art. Using the paint disclosed herein can reduce the production period of manufacturing painted bamboo products while providing cost savings. A paint spraying method is also disclosed.

In one embodiment, a paint is disclosed that may be sprayed on bamboo products, such as on the exterior surface of a slim tube-shaped bamboo product. The disclosed paint is a nonaqueous acrylic-based paint composition including the following components by weight percents based on the total wet composition weight: 10 to 15 percent by weight of one or more flatting powders, 50 to 55 percent of one or more acrylic resins, 1 to 5 percent of one or more leveling agents, 13 to 16 percent of one or more ester solvents, 10 to 15 percent of one or more alcohol solvents, and 8 to 10 percent of one or more ether solvents. After application of the wet paint composition, the solvents evaporate leaving a dried film of the acrylic resins, flatting powders and leveling agents on the surface of the bamboo product. The flatting powder can be a silica powder. The viscosity of the paint composition can be approximately 20 cps.

A method for painting a bamboo product includes the steps of (1) removing flock from the surface of the bamboo product to produce a smooth bamboo surface; (2) preparing a paint composition comprising 10 to 15 percent by weight of one or more flatting powders, 50 to 55 percent by weight of one or more acrylic resins, 1 to 5 percent by weight of one or more leveling agents, 13 to 16 percent by weight of one or more ester solvents, 10 to 15 percent by weight of one or more alcohol solvents, and 8 to 10 percent by weight of one or more ether solvents; (3) applying the paint composition on the surface of the bamboo product; and (4) drying the paint composition on the surface of the bamboo product.

The paint composition can be sprayed on the bamboo product from an air gun at an air pressure of 0.45 Mpa.

Once sprayed, the bamboo product may be dried for about 15 minutes at a temperature of about 70 to about 75 degrees Celsius.

After the first coat of paint has dried, a second coat of paint can be applied to the dried first coat of paint.

When spraying the paint composition on the surface of the bamboo product, the bamboo product can be rotated at 3 to 5 revolutions per second.

When spraying the paint composition on the surface of the bamboo product, the paint is applied to the surface of the bamboo product for 3 to 5 seconds.

Compared with the prior art paint and method, the disclosed paint has the advantage that the paint is sprayed on the surface of the slim tube-shaped bamboo product without the use of a putty or sanding of the putty. The flatting powder used as the filler in the paint is characterized by being a superfine powder. After the paint is sprayed on the bamboo product, the superfine flatting powder fills in the pores so that the paint spreads on the surface of the bamboo product and is not absorbed into the pores. In addition, as the paint prepared is transparent paint, the original pattern on the surface of the bamboo product is visible. Furthermore, the difficulty of the process to spray the paint on the slim tube-shaped bamboo product is significantly reduced. The production period is reduced and costs are saved.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a flow diagram illustrating one embodiment of a method for painting a bamboo product.

DETAILED DESCRIPTION

The present disclosure relates to a paint, and in particular, a paint that is suitable for painting bamboo products. "Bamboo" as used herein refers to any of the plants of the family Poaceae, and/or subfamily Bambusoideae. Also disclosed is a method for painting bamboo products. The paint and method disclosed herein are particularly suited for painting slim tube-shaped bamboo products, such as pens.

Referring to FIG. 1, a painting method is illustrated for use with the paint disclosed herein. The method starts with block 100. From block 100, the method enters block 102. In block 102, any product, but in particular a product having a bamboo surface that is to be painted, is obtained, such as a slim tube-shaped bamboo product. The product can be placed on a production assembly line, such as a conveyor. Also, slim tube-shaped bamboo products can be placed on a rotating spindle or mandrel that will allow the product to be spun while the paint is being sprayed thereon. From block 102, the method enters block 104.

In block 104, flock or the fine fibers or tufts of fibers that are found on the surface of the bamboo surface are removed, such as by scraping, brushing, or sanding machines. Removal of flock can also be done manually. The result is a smooth bamboo surface which can be painted. From block 104, the method enters block 106.

In block 106, the paint components are combined and mixed. In one embodiment, the paint is a nonaqueous acrylic-based paint. The paint disclosed herein includes one or more flatting powders, one or more acrylic resins, one or more leveling agents, one or more ester solvents, one or more alcohol solvents, and one or more ether solvents.

Flatting agents are conventionally used to control gloss or sheen in paints. In the present disclosure, the flatting agent is used to fill pores in the spaces between bamboo fibers. Flatting powders used as fillers in the paint are characterized as superfine powders. After the paint is sprayed on the bamboo product, the superfine flatting powder fills in the pores so that the paint spreads on the surface of the bamboo product and is not absorbed into the pores. Representative flatting agents for use in the disclosed paint include, but are not limited to, one or more of the following: calcium carbonate, talc, clay, silicic acid, silicates, such as magnesium silicate or aluminum silicate, silica, asbestos, and mica. The flatting agent is a superfine powder having particulates that are micron sized particulates.

As used herein, an acrylic resin refers to a resin resulting from the polymerization of acrylic acid or derivatives of acrylic acids, including esters of acrylic acid, methacrylic acid, acrylonitrile, and related copolymers. The acrylic resins act as a binder and adhesive. Acrylic resins for use in paint formulations are commercially available under various designations. The disclosed embodiment optionally does not include pigments so that the paint when dried is transparent to show the bamboo surface.

A leveling agent, as used herein, refers to a compound or composition that improves and/or prevents defects or irregularities on the surface coating of wet paints when drying so as to result in a smooth dry film. To achieve good substrate wetting, the paint has a surface tension equal to or lower than the substrate to be painted. A suitable leveling agent should have a lower surface tension than that of the acrylic resin and be compatible with the acrylic resin. Leveling agents are commercially available by various designations.

The disclosed paint includes one or more organic solvents. Solvents act as a vehicle to carry the acrylic resin, leveling agents, and flatting agents when being sprayed on the bamboo product. Once applied to the bamboo product, the solvents will evaporate leaving a dry film of acrylic resin, leveling agent, and flatting agent adhered to the bamboo surface. Organic solvents are used for their faster drying time as opposed to water-based solvents. Solvents used in the paint may include one or more of ester solvents, alcohol solvents, and ether solvents. Representative ester solvents include, but are not limited to, ethyl acetate and butyl acetate. Representative alcohol solvents include, but are not limited to, isopropanol, methanol, ethanol, and n-butanol. Representative ether solvents include, but are not limited to, ethyl ether, butyl ether, dioxane, dichloroethyl ether, and polyethers. See, for example, U.S. Pat. No. 4,304,711, incorporated herein expressly by reference.

The paint formulation is a nonaqueous acrylic-based paint composition including the following components in weight percents based on the total wet composition weight: 10 to 15 percent by weight of one or more flatting powders, 50 to 55 percent by weight of one or more acrylic resins, 1 to 5 percent by weight of one or more leveling agents, 13 to 16 percent by weight of one or more ester solvents, 10 to 15 percent by weight of one or more alcohol solvents, and 8 to 10 percent by weight of one or more ether solvents. The preferred ester, alcohol, and ether solvents are ethyl acetate, isopropanol, and butyl ether, respectively. The viscosity of the paint prepared by mixing the paint components in the proportions above is approximately 20 cps.

In a first embodiment, the paint composition includes the following components by weight based on the total weight of the wet composition: about 10 percent by weight of flatting powder, about 50 percent by weight of acrylic resin, about 15 percent by weight of ethyl acetate, about 10 percent by weight of isopropanol, about 5 percent by weight of leveling agent, and about 10 percent by weight of butyl ether.

In a second embodiment, the paint composition includes about 12 percent by weight of flatting powder, about 53 percent by weight of acrylic resin, about 14 percent by weight of ethyl acetate, about 12 percent by weight of isopropanol, about 1 percent by weight of leveling agent, and about 8 percent by weight of butyl ether.

In a third embodiment, the paint composition includes about 13 percent by weight of flatting powder, about 50 percent by weight of acrylic resin, about 13 percent by weight of ethyl acetate, about 14 percent by weight of isopropanol, about 2 percent by weight of leveling agent, and about 8 percent by weight of butyl ether.

In a fourth embodiment, the paint composition includes about 10 percent by weight of flatting powder, about 50 percent by weight of acrylic resin, about 15 percent by weight of ethyl acetate, about 14 percent by weight of isopropanol, about 1 percent by weight of leveling agent, and about 10 percent by weight of butyl ether.

In block 106, the components are accurately weighed and mixed uniformly to obtain the paint to be sprayed on the bamboo product.

From block 106, the method enters block 108. In block 108, the paint is sprayed on the bamboo product. The device for spraying may include a single-line, double high-pressure air gun. The air pressure of the single-line, double high-pressure air gun is set to be approximately 0.45 Mpa. The slim tube-shaped bamboo product may be rotating while being sprayed with the paint. The speed of autorotation of the bamboo product can be 3 to 5 revolutions per second. The single-line, double guns are used for spraying the paint on the surface of the bamboo product for 3 to 5 seconds for the first time in block 108. From block 108, the method enters block 110.

In block 110, the bamboo product painted for the first time in block 108 is placed in a dryer for drying for about 15 minutes at a temperature of 70 to 75 degrees Celsius. From block 110, the method enters block 112.

In block 112, the painted and dried bamboo product may be sprayed with the paint for a second time. The conditions for the air pressure, time, and revolutions of the bamboo product are similar as described for block 108. From block 112, the method enters block 114.

In block 114, the twice painted bamboo product is placed in a dryer for drying a second time for about 15 minutes at a temperature of 70 to 75 degrees Celsius. From block 114, the method enters block 116.

Block 116 signals the termination of the method, resulting in a finished painted bamboo product.

While illustrative embodiments have been illustrated and described, it will be appreciated that various changes can be made therein without departing from the spirit and scope of the invention.

The embodiments of the invention in which an exclusive property or privilege is claimed are defined as follows:

1. A paint composition, comprising:

10 to 15 percent by weight of one or more flatting powders wherein the amount is effective to fill pores in a substrate on which the paint composition is applied;

50 to 55 percent by weight of one or more acrylic resins;
1 to 5 percent by weight of one or more leveling agents;
13 to 16 percent by weight of ethyl acetate;
10 to 15 percent by weight of isopropanol; and
8 to 10 percent by weight of butyl ether, wherein the percents by weight are based on the total weight of a wet composition.

2. The method of claim 1, wherein the viscosity of the paint is approximately 20 cps.

3. The paint composition of claim 1, wherein the paint is a nonaqueous paint.

4. The paint composition of claim 1, wherein the paint is a transparent paint.

5. The paint composition of claim 1, comprising:
about 10 percent by weight of flatting powder;
about 50 percent by weight of acrylic resin;
about 15 percent by weight of ethyl acetate;
about 14 percent by weight of isopropanol;
about 1 percent by weight of leveling agent; and
about 10 percent by weight of butyl ether, wherein the percents by weight are based on the total weight of a wet composition.

6. The paint composition of claim 1, comprising:
about 12 percent by weight of flatting powder;
about 53 percent by weight of acrylic resin;
about 14 percent by weight of ethyl acetate;
about 12 percent by weight of isopropanol;
about 1 percent by weight of leveling agent; and
about 8 percent by weight of butyl ether, wherein the percents by weight are based on the total weight of a wet composition.

7. The paint composition of claim 1, comprising:
about 13 percent by weight of flatting powder;
about 50 percent by weight of acrylic resin;
about 13 percent by weight of ethyl acetate;
about 14 percent by weight of isopropanol;
about 2 percent by weight of leveling agent; and
about 8 percent by weight of butyl ether, wherein the percents by weight are based on the total weight of a wet composition.

8. The paint composition of claim 1, comprising:
about 10 percent by weight of flatting powder;
about 50 percent by weight of acrylic resin;
about 15 percent by weight of ethyl acetate;
about 14 percent by weight of isopropanol;
about 1 percent by weight of leveling agent; and
about 10 percent by weight of butyl ether, wherein the percents by weight are based on the total weight of a wet composition.

9. A bamboo product comprising a dried film formed on the surface of the bamboo product from applying the paint composition of claim 1.

10. The bamboo product of claim 9, wherein the product is a slim tube-shaped product.

11. A method for painting a bamboo product, comprising:
removing flock from the surface of the bamboo product to produce a smooth bamboo surface;
preparing a paint composition according to claim 1;
applying the paint composition on the surface of the bamboo product; and
drying the paint composition on the surface of the bamboo product.

12. The method of claim 11, wherein the viscosity of the paint composition is approximately 20 cps.

13. The method of claim 11, comprising spraying the paint composition on the bamboo product from an air gun at an air pressure of 0.45 Mpa.

14. The method of claim 1, comprising drying the bamboo product after applying the paint for about 15 minutes at a temperature of about 70 to about 75 degrees Celsius.

15. The method according to claim 14, comprising applying a second coat of paint after the first coat has dried.

16. The method of claim 11, wherein the bamboo product is rotated while the paint is applied at 3 to 5 revolutions per second.

17. The method of claim 11, wherein the paint is applied on the surface of the bamboo product for 3 to 5 seconds.

18. The method of claim 11, wherein the bamboo product is a slim tube-shaped bamboo product.

19. A paint composition, comprising:
10 to 15 percent by weight of one or more flatting powders wherein the amount is effective to fill pores in a substrate on which the paint composition is applied, wherein 100% by weight of the flatting agents is micron sized particulates of silica;
50 to 55 percent by weight of one or more acrylic resins;
1 to 5 percent by weight of one or more leveling agents;
13 to 16 percent by weight of ethyl acetate;
10 to 15 percent by weight of isopropanol; and
8 to 10 percent by weight of butyl ether, wherein the percents by weight are based on the total weight of a wet composition.

* * * * *